Figure 11:
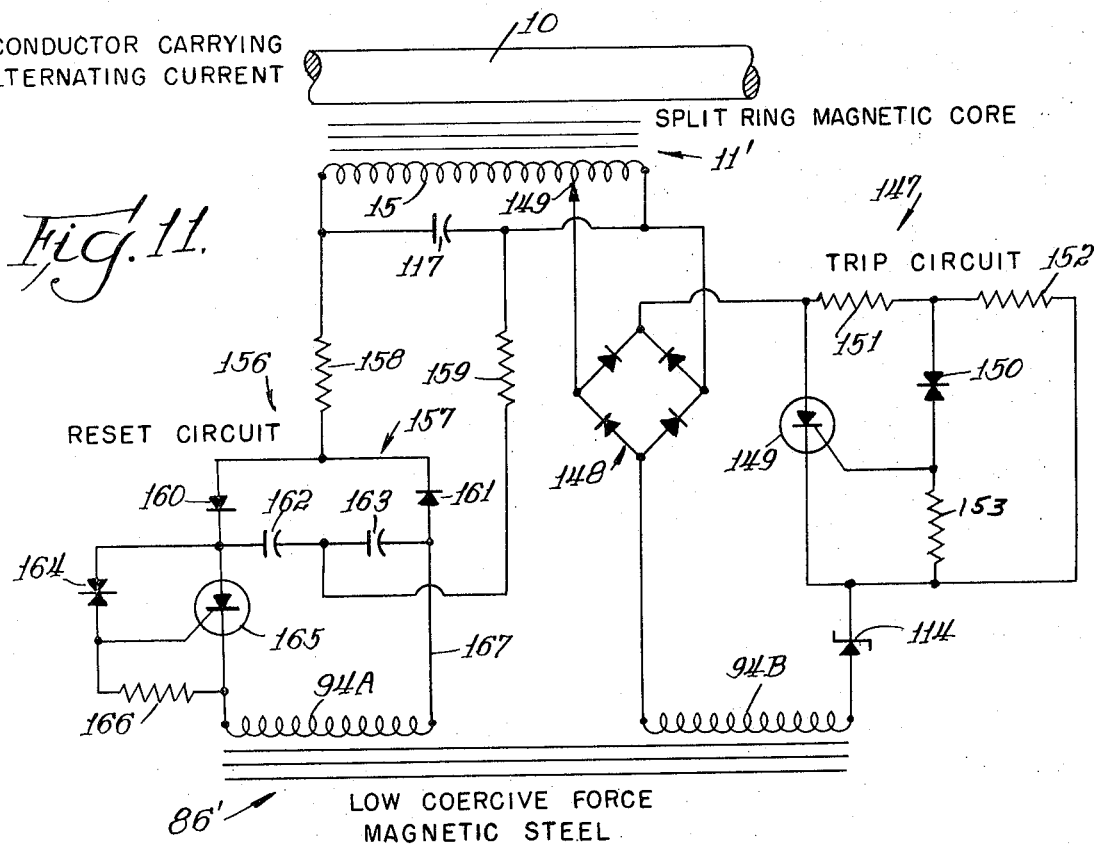

United States Patent [19]

Schweitzer, Jr.

[11] 3,816,816

[45] June 11, 1974

[54] INDICATING AND AUTOMATICALLY RESETTABLE SYSTEM FOR DETECTION OF FAULT CURRENT FLOW IN A CONDUCTOR

[75] Inventor: Edmund O. Schweitzer, Jr., Northbrook, Ill.

[73] Assignee: E. O. Schweitzer Manufacturing Co., Inc., Mundelein, Israel

[22] Filed: Aug. 7, 1972

[21] Appl. No.: 278,253

Related U.S. Application Data

[63] Continuation-in-part of Ser. Nos. 873,393, Nov. 3, 1969, abandoned, and Ser. No. 55,532, July 16, 1970, abandoned.

[52] U.S. Cl.................. 324/133, 324/51, 324/102, 340/253 A
[51] Int. Cl........................ G01r 19/16, G01r 31/02
[58] Field of Search ............ 324/51, 132, 102, 133, 324/127; 340/253 R, 253 A, 253 P; 317/31

[56] References Cited
UNITED STATES PATENTS 3,263,170  7/1966  Schneider.................... 324/132 X
3,375,510  3/1968  Pitches........................... 324/133 X
3,419,756  12/1968  Philbert et al. ............... 324/51 UX
3,518,544  6/1970  Tachick ......................... 324/133 X
3,524,133  8/1970  Arndt............................. 324/133 X
3,720,872  3/1973  Russell et al...................... 324/133

Primary Examiner—Gerard R. Strecker
Attorney, Agent, or Firm—Robert R. Lockwood

[57] ABSTRACT

Fault current flow in a conductor above a predetermined value generates a magnetic field in one direction between the poles of a magnetic core while current flow below this value generates a magnetic field in the opposite direction. A permanent magnetic indicator is movable in response to these magnetic fields and remains in a corresponding position until acted on by the next change in direction of the magnetic field. The magnetic core has one or more pairs of poles and the permanent magnet indicator has a corresponding polar arrangement. The magnetic core has sufficient retentivity to maintain the permanent magnet indicator in the position to which it was last operated when current flow in the conductor is interrupted.

13 Claims, 11 Drawing Figures

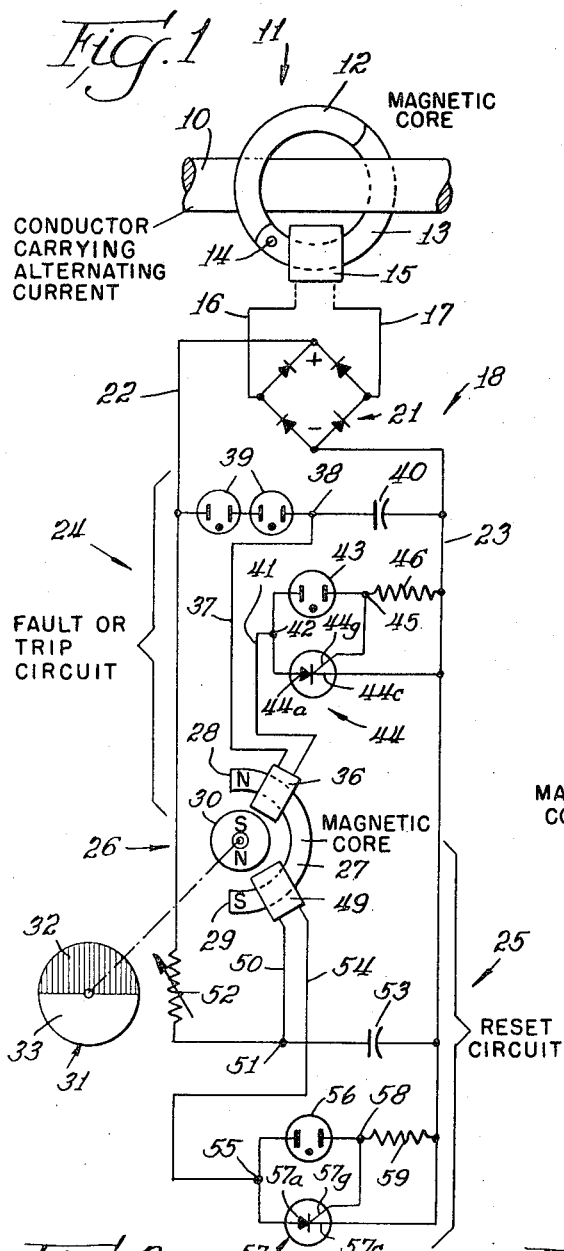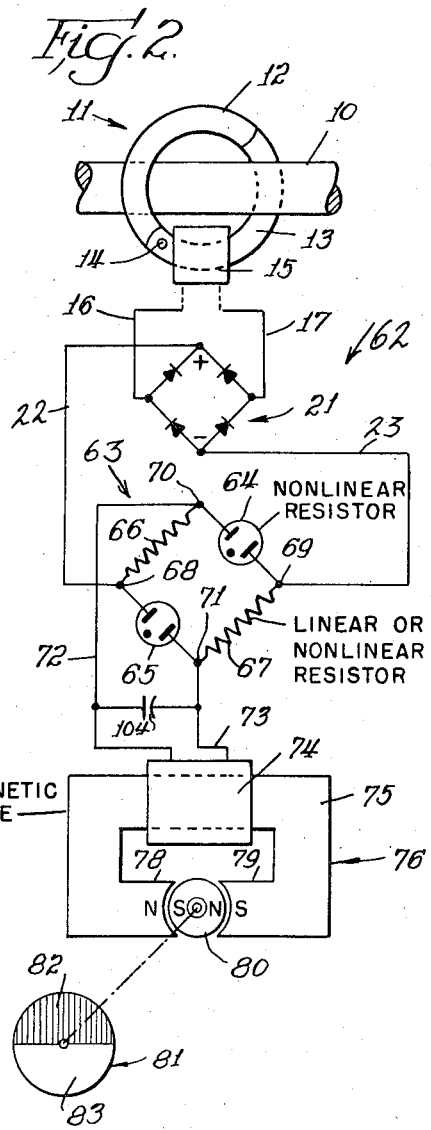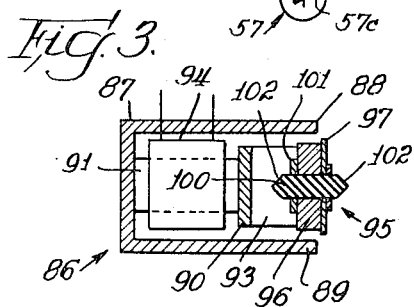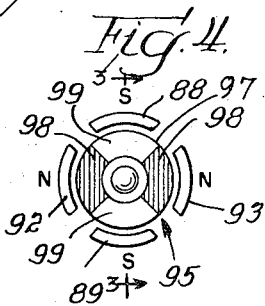

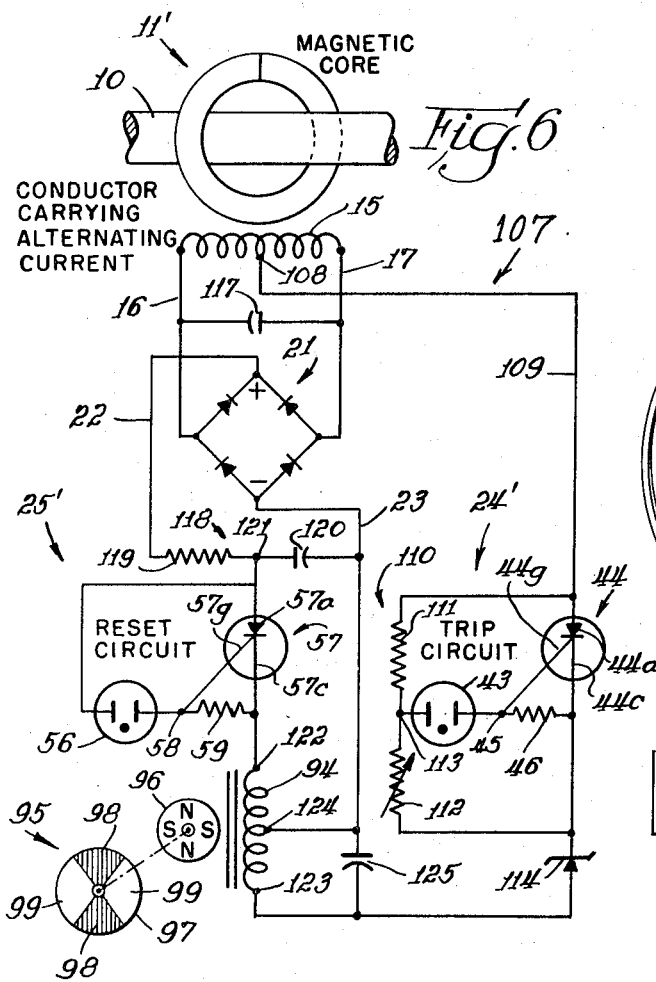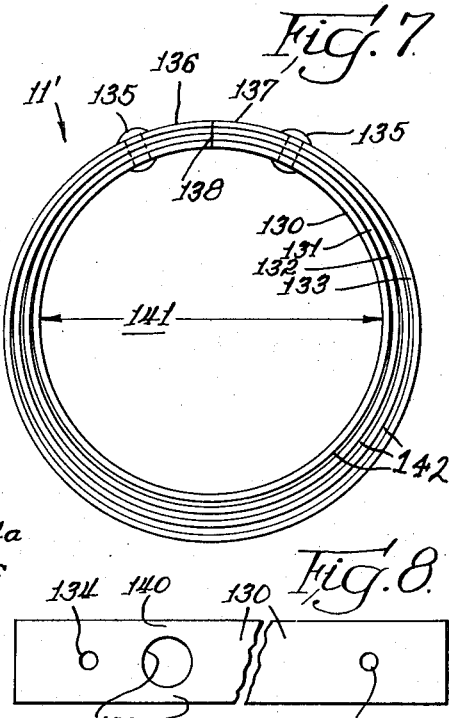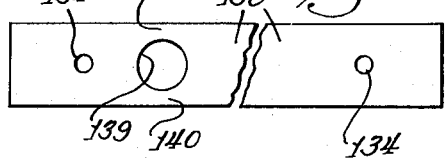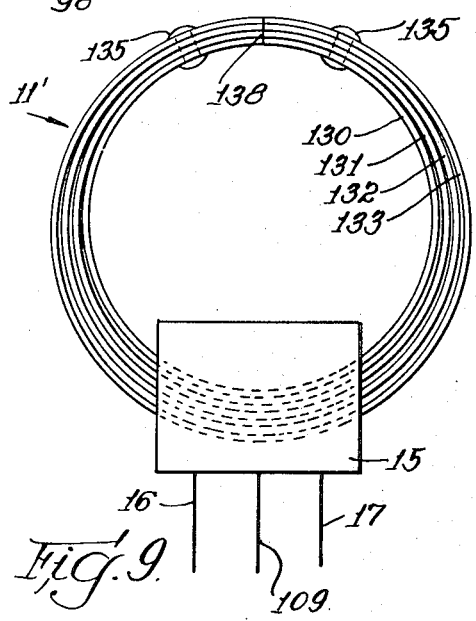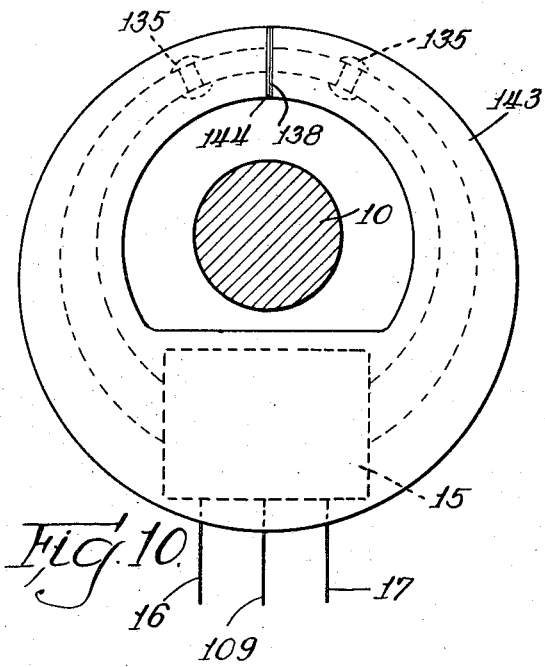

INDICATING AND AUTOMATICALLY RESETTABLE SYSTEM FOR DETECTION OF FAULT CURRENT FLOW IN A CONDUCTOR

This application is a continuation-in-part of application Ser. No. 873,393, filed Nov. 3, 1969, now abandoned, and application Ser. No. 55,532, filed July 16, 1970, now abandoned.

This invention is an improvement over the invention disclosed in my U.S. Pat. No. 3,426,275, issued Feb. 4, 1969.

In the above patent a fault indicator is disclosed for application to a current carrying conductor. When the current flow exceeds a predetermined value, an indicator changes position in response thereto and remains in the changed position until it is reset manually to the original position.

Among the objects of this invention are: To provide for automatically resetting the indicator to its normal indicating position; to generate a magnetic field in one direction in response to current flow in a conductor below a predetermined value and to generate a magnetic field in the opposite direction when the current flow in the conductor exceeds this value; to shift an indicator from one position to another position in response to one or the other of the magnetic fields; to maintain the indication when current flow in the conductor is interrupted; to provide for independently tripping and resetting the indicator; to rest the indicator on flow of current in the conductor ranging from a relatively low value to a value approaching the trip value; to provide a magnetic core without pivotal connections for embracing the conductor; and to form the core of flexible laminations having sufficient resiliency to admit the conductor and close the gap at the ends of the laminations.

According to this invention a unidirectional voltage is generated the magnitude of which corresponds to the magnitude of current flow, such as alternating current flow, in a counductor in which normal load current flows and which is subject to fault current flow. During normal current flow a magnetic field is generated in a magnetic core in one direction to hold an indicator in one position indicating such current flow. When fault current flows, a magnetic field is generated in the magnetic core in the opposite direction and the indicator is shifted to an alternate position in response thereto. In one embodiment of this invention a fault or trip current energizes a trip winding on the core in response to fault current flow in the conductor to generate one of the magnetic fields. On reenergization of the conductor with normal current flow, a reset circuit energizes a reset winding on the core to generate the other magnetic field. In another embodiment of this invention the output of a non-linear bridge circuit, energized according to current flow in the conductor, is applied to a winding on the magnetic core to generate the magnetic fields in opposite directions. In a further embodiment of this invention independent trip and reset circuits are employed to control the position of the indicator. The magnetic core for embracing the conductor has no pivot joints but is formed of prestressed circular laminations the inherent resiliency of which permits the ends to be separated to receive the conductor and causes them to be juxtaposed to close the gap therebetween and minimize the effect of the gap on the reluctance of the magnetic circuit.

In the drawings: FIG. 1, shows diagrammatically one embodiment of this invention employing a fault or trip circuit and a reset circuit for controlling the operation of an indicator. FIG. 2 shows diagrammatically another embodiment of this invention in which a non-linear bridge circuit is employed for energizing a winding on a magnetic core to generate magnetic fields in opposite directions depending upon the magnitude of the current flow in a conductor. FIG. 3 is a vertical sectional view taken generally along line 3—3 of FIG. 4 and shows a modified form of indicator that can be employed in the system shown in either FIG. 1 or in FIG. 2. FIG. 4 is a view, in end elevation, of the magnetic field structure shown in FIG. 3. FIG. 5 is a plan view of the permanent magnet employed in the construction shown in FIGS. 3 and 4. FIG. 6 shows diagrammatically a further embodiment of the invention employing a magnetic core free of hinged joints. FIG. 7 is a view, in side elevation, of the magnetic core formed of laminations or strips of prestressed oriented silicon steel.

FIG. 8 shows a plan view of a strip of the magnetic core shown in FIG. 7. FIG. 9 is a view, similar to FIG. 7, showing the application of the secondary winding. FIG. 10 illustrates how the transformer is applied to a current carrying conductor, the core and coil having been encapsulated. FIG. 11 shows diagrammatically another embodiment of this invention.

In FIG. 1 reference character 10 designates a conductor that may be employed for carrying alternating current. More specifically conductor 10 may be employed for interconnecting the primary windings of pad mounted transformers, the conductor 10 normally being buried below the surface of the earth. It is desirable to provide means for detecting when current in excess of a predetermined value, such as a fault current has flowed through the conductor 10. For this purpose an annular magnetic core 11 is provided around the conductor 10. The magnetic core 11 may be formed of silicon steel laminations and it may have a a cross sectional area of 1/2 square inch. The magnetic core 11 is preferably formed in two sections 12 and 13 which are hinged at 14 to facilitate application to the conductor 10. However, it will be understood that the magnetic core 11 can be continuous with provision being made for inserting the conductor 10 therethrough.

The magnetic flux induced in the magnetic core 11 is proportional to the magnitude of the alternating current flow in the conductor 10. A winding 15 encircles a portion of the magnetic core 11, specifically a portion of the section 13, and it has induced therein an alternating voltage which is a function of the magnitude of the current flow in the conductor 10. The winding 15 can be formed of 5,000 turns of No. 36 insulated wire. The winding 15 is connected by conductors 16 and 17 to a current flow indicator system that is indicated, generally, at 18. It will be noted that the conductors 16 and 17 are indicated, in part, by broken lines. This is to show that the current flow indicator system 18 can be positioned remotely from the winding 15 on the magnetic core 11. The reason for this is to permit the location of the current flow indicator system 18 at a convenient location where it can be inspected by a lineman or other personnel. It will be understood, however, that the current flow indicator system 18 can be mounted integrally with the magnetic core 11 and the winding 15.

The current flow indicator system 18 includes a full wave rectifier that is indicated, generally, at 21. Its input terminals are connected, as illustrated, for energization from the winding 15. Its output terminals are connected to conductors 22 and 23 between which a direct voltage appears that is a function of the current flow in the conductor 10.

Connected for energization between the conductors 23 and 24 is a fault or trip circuit, indicated generally at 24, and a reset circuit, indicated generally at 25. These circuits are arranged to control the operation of an indicator that is indicated, generally, at 26.

The indicator 26 includes a C-shaped magnetic core that can be formed of 3.5 percent chrome steel. The magnetic core 27 includes poles 28 and 29 which may be magnetized to the polarities indicated as a result of fault current flow through the conductor 10. When the flow of current in the conductor 10 is below a predetermined value, less than the fault current, the polarities of the poles 28 and 29 are reversed in a manner to be described. The indicator 26 also includes a rotatably mounted permanent magnet 30 that may be formed of ceramic material and magnetized along a diameter so that the poles of the polarities indicated there appear. Connected to the permanent magnet 30 is an indicator disk 31 which rotates therewith. The indicator disk 31 is provided with a red section 32 and a white section 33 which may be formed of corresponding colored reflecting tapes. It will be understood that a suitable mask overlies the indicator disk 31 so that only the red section 32 or the white section 33 is visible at one time.

The fault or trip circuit 24 includes a trip winding 36 that encircles a portion of the magnetic core 27. The trip winding 36 can be formed of 100 turns of No. 20 insulated wire. When it is energized, the magnetic core 27 is magnetized to provide the polarities indicated at the poles 28 and 29. A conductor 37 connects one side of the trip winding 36 to a junction 38 between a pair of series connected glow discharge devices 39 and a capacitor 40. It will be noted that the series connected glow discharge devices 39 and capacitor 40 are connected between the conductors 22 and 23 and thus have applied thereto a direct voltage which is a function of a current flow in the conductor 10. The glow discharge devices may be neon lamps each having a breakover voltage of 95 volts. The capacitor 40 may have a capacitance of 2 mfd.

The other side of the trip winding 36 is connected by a conductor 41 to a junction 42 between a glow discharge device 43, such as a neon lamp which may have a breakover voltage of 65 volts, and the anode 44a of a silicon controlled rectifier that is indicated, generally, at 44. The silicon controlled rectifier 44 also includes a cathode 44c and a gate 44g. The cathode 44c is connected, as shown to the conductor 23 while the gate 44g is connected to a junction 45 between the glow discharge device 43 and a resistor 46 which may have a resistance of 350 ohms and is connected to the conductor 23.

The normal current flow in the conductor 10 may be of the order of 100, 200, 450 or 1,000 amperes depending upon the system in which the conductor 10 is connected. These values are merely illustrative of maximum normal current flows which, when substantially exceeded usually involve flow of fault current which it is desirable to detect by operation of the indicator disk 31 to the position shown in FIG. 1. When normal current flows in the conductor 10, the arrangement is such that the direct voltage appearing between conductors 22 and 23 is insufficient to cause the glow discharge devices 39 to breakover and become conductive. On flow of fault current, sufficient direct voltage is applied between the conductors 22 and 23 to cause the glow discharge devices 39 to breakover and become conductive. This charges capacitor 40 to a voltage of about 65 volts which is sufficient to trigger glow discharge device 43 and permit the capacitor 40 to discharge through the silicon controlled rectifier 44 and the trip winding 36. The flow of current in the trip winding 36 is in such a direction as to magnetize the magnetic core 27 to provide the polarities which are indicated in conventional manner at the poles 28 and 29. The reaction between the polarities at the pole 28 and 29 is such as to cause the permanent magnet 30 to rotate to the position shown in FIG. 1. where its diametrically opposite poles are located as indicated here with opposite poles being adjacent each other. A corresponding rotation of the indicator disk 31 takes place to the position here shown. As long as fault current continues to flow in the conductor 10, current continues to flow through the silicon controlled rectifier 44 to continue the energization of the fault or trip winding 36. The flow of fault current in the conductor 10 is interrupted by operation of a fuse or circuit breaker. Current then ceases to flow in the fault or trip winding 36. However, the retentivity of the magnetic core 27 is sufficient to hold the permanent magnet 30 and the indicator disk 31 in the position shown in FIG. 1.

As pointed out above, it is desirable to automatically reset the indicator 26 after the current flow through the conductor 10 has been interrupted or the current flow therethrough drops to a value not exceeding the normal current flow in the conductor 10. In the meantime, due to the retentivity of the magnetic core 27 as pointed out, the permanent magnet 30 and thereby the indicator disk 31 continue to be held in the position indicating that fault current has flowed through the conductor 10. For automatically resetting the indicator 26, a reset winding 49 is mounted on the magnetic core 27. One side of it is connected by a conductor 50 to a junction 51 between a variable resistor 52, which may have a total resistance of 330,000 ohms, and a capacitor 53 which may have a capacitance of 2 mfd. It will be noted that the resistor 52 and capacitor 53 are connected between the conductors 22 and 23 and thus have the direct voltage applied thereto which is a function of a current flow in the conductor 10. The variable resistor 52 is employed to vary the rate at which the capacitor 53 is charged to determine the time interval for operation of the reset circuit 25 on restoration of normal current flow in the conductor 10. The other side of the reset winding 49 is connected by a conductor 54 to a junction 55 between a glow discharge device 56, which may be a neon lamp having a breakover voltage of 95 volts, and an anode 57a of a silicon controlled rectifier that is indicated, generally, at 57. The silicon controlled rectifier 57 also includes a cathode 57c, which is connected to the conductor 23, and a gate 57g, which is connected to a junction 58 between the glow discharge device 56 and a resistor 59 which is connected to the conductor 23. The resistor 59 may have a resistance of 350 ohms.

On restoration of flow of normal current through the conductor 10, the voltage between the conductors 22 and 23 is insufficient to effect the breakdown of the glow discharge devices 39. Accordingly, no current flows through the trip winding 36. On flow of current in the conductor 10, above a predetermined minimum value of the order of 20 amperes, capacitor 53 is charged through variable resistor 52 to a voltage of the order of 95 volts which is sufficient to trigger the glow discharge device 56 and permit the capacitor 53 to discharge through the silicon controlled rectifier 57 and the reset winding 49. As a result of this current flow magnetic flux is induced in the magnetic core 27 in such a direction as to reverse the polarities of the poles 28 and 29 from the polarities shown in FIG. 1. Then the poles on the permanent magnet 30 are repelled and it together with the indicator disk 31 rotates through 180° to reverse the positions of the red and white sections 32 and 33 and thereby indicate that normal current is flowing in the conductor 10. Should the flow of normal current of the conductor 10 be interrupted, current will cease to flow through the reset winding 49. However, because of the retentivity of the magnetic core 27, the permanent magnet 30 and the indicator disk 31 remain in the position just described.

By varying the resistance in series with the capacitor 53 through adjustment of the variable resistor 52, the time required to charge it to operating voltage can be changed with a corresponding change in the time required to cause current to flow through the reset winding 49. There is thus a corresponding time delay in resetting the indicator disk 31 to the normal position.

The automatic resetting of the indicator 26 is important. When this occurs, it is necessary for a lineman to obtain access to the indicator 26 and then manually reset it to a position corresponding to normal current flow in the conductor 10.

On flow of fault current in the conductor 10 and energization of the trip winding 36 in the manner described, current ceases to flow through the reset winding 49. The reason for this is that the reset circuit 25 will not be triggered under these circumstances because of the voltage drop occurring between the conductors 22 and 23 as a result of the load applied by the triggering of the fault or trip circuit 24. Thus, as long as the flow of fault current continues in the conductor 10, only the trip winding 36 will be energized.

FIG. 2 shows a modification of the system illustrated in FIG. 1. Certain of the same elements are employed as previously described. Accordingly, their description will not be repeated. The winding 15 corresponds to the winding 15 shown in FIG. 1 except that, for FIG. 2 it may comprise 6,000 turns of No. 37 insulated wire. As before, the full wave rectifier 21 is connected for energization between conductors 16 and 17. It forms a part of a current flow indicator system that is indicated, generally, at 62. The output conductors 22 and 23 from the full wave rectifier 21 are connected to energize a four arm bridge circuit that is indicated, generally, at 63. Opposite arms of the bridge circuit 63 include non-linear resistors 64 and 65 which may be neon lamps which have the characteristic that the resistance thereof decreases with increase in the voltage applied thereto. Preferably two non-linear resistors 64 and 65 are employed. However, one can be omitted with the substitution of a linear resistor therefor. In the other opposite arms of the bridge circuit 63 linear resistors 66 and 67 are connected. They may be of like value each having a resistance of 7,500 ohms which is less than the resistance of the non-linear resistors 64 and 65 with no direct voltage applied thereto. Alternatively, instead of the linear resistors 66 and 67, non-linear resistors, such as tungsten lamps, can be employed which have a non-linear characteristic opposite to that of the non-linear resistors 64 and 65 in the other two arms. As indicated, one pair 68 and 69 of opposite terminals of the bridge circuit 63 are connected to the conductors 22 and 23 for energization from the full wave rectifier 21 with a direct voltage which is a function of the current flow in the conductor 10. The other pair 70 and 71 of opposite terminals of the bridge circuit 63 are connected by conductors 72 and 73 to a winding 74 which encircles a C-shaped magnetic core 75 that may be formed of carbon steel. The winding 74, which may comprise 6,000 turns of No. 37 insulated wire, and magnetic core 75 form a part of a fault current indicator that is indicated, generally, at 76. It also includes poles 78 and 79 on the magnetic core 75 between which a permanent magnet 80, similar to the permanent magnet 30 previously described, is rotatably mounted. An indicator disk 81 is connected to and is rotatable with the permanent magnet 80 which is magnetized to opposite polarities, as indicated, along a diameter. The indicator disk 81 is provided with red and white sections 82 and 83, preferably formed of reflecting tapes. As described hereinbefore, a suitable mask is employed to permit observation of only one or the other of the sections 82 and 83.

When the current flow in the conductor 10 is below a predetermined value or normal current flows therethrough, a corresponding direct voltage appears between the conductors 22 and 23. A voltage appears between the output terminals 70 and 71 of the bridge circuit 63 of one polarity. As the current flow in the conductor 10 increases, there is a corresponding increase in the direct voltage between the conductors 22 and 23. The bridge circuit 63 becomes balanced with no voltage appearing between output terminals 70 and 71 since the resistance of the non-linear resistors 64 and 65 decreases to equal the resistance of the linear resistors 66 and 67. On flow of fault current in the conductor 10, a still higher direct voltage appears between the conductors 22 and 23. The polarity of the voltage appearing between the terminals 70 and 71 is reversed since the resistance of the non-linear resistors 64 and 65 become correspondingly less than the resistance of the linear resistors 66 and 67. This reversed polarity voltage is applied to the winding 74 with the result that the poles 78 and 79 are energized with the polarities indicated to cause the permanent magnet 80 to rotate to the position shown in FIG. 2 where its poles are opposite unlike poles 78 and 79. There is a corresponding movement of the indicator disk 81 to this position. On interruption of the flow of current in the conductor 10, current ceases to flow in the winding 74. However, the retentivity of the magnetic core 75 is such as to maintain the permanent magnet 80 in the position shown in FIG. 2.

On restoration of normal current flow in the conductor 10, the voltage appearing between the terminals 70 and 71 is reversed from that appearing under fault current conditions. There is a corresponding reversal in the polarity of the voltage applied to the winding 74. This is followed by a reversal in the polarities of the poles 78 and 79. As a consequence the permanent magnet 80 rotates through 180° from its position shown in FIG. 2 and causes the indicator disk 81 to rotate therewith to show that normal current is flowing in the conductor 10. If the flow of normal load current in the conductor 10 is interrupted, the permanent magnet 80 will remain in the corresponding position due to the retentivity of the magnetic core 74. The rotation of the permanent magnet 80 and indicator disk 81 to the normal position takes place as soon as a minimum current, such as 20 amperes, flows in the conductor 10. There is no time delay.

If it is desired to increase the torque available for shifting the indicator disk 81 from one position to the other, the magnetic field structure, indicated generally at 86 in FIGS. 3 and 4, can be employed. Here a four pole field structure is shown. It includes an outer yoke section 87 of magnetic material which provides poles 88 and 89. There is an inner yoke section 90 that is connected to the outer yoke section 87 by a connecting section 91 of magnetic material. The inner yoke section 90, also of magnetic material, provides poles 92 and 93 that are located midway between the poles 88 and 89 of the outer yoke section 87. A winding 94 encircles the connecting section 91. It may be connected in the system shown in FIG. 2 in place of the winding 74. For FIG. 1 two windings 94, properly connected, are employed.

A rotatable indicator assembly, shown generally at 95, is located within the poles 88-89 and 92-93. This assembly includes a permanent magnet 96 which is shown in FIG. 5, is magnetized to have a pair of diametrically opposite poles of one polarity alternating with a pair of diametrically opposite poles of opposite polarity. An indicator disk 97 is mounted for rotation with the permanent magnet 96 and it has diametrically opposite red sections 98 and white sections 99. The permanent magnet 96 and indicator disk 97 rotate through an angle of 90° from one indicating position to the next rather than through 180° as is the case when the two pole arrangements shown in FIGS. 1 and 2 are used. The permanent magnet 96 and indicator disk 97 are mounted on a hub 100 and are secured thereto by a retaining washer 101. Conical bearing portions 102 at the ends of the hub 100 provide for rotatably mounting the indicator assembly at 95 in suitable bearings such that the assembly 95 is symmetrically located with respect to the poles 88-89 and 92-93. A mask, not shown, overlies the indicator disk 97 to permit observation of only the red sections 89 or the white sections 99.

The operation of the magnetic field structure 86 in the systems shown in FIGS. 1 and 2 is essentially the same as previously described except that the indicator assembly 95 rotates through only a quarter revolution rather a half revolution in shifting from one indicating position to the other.

Time delay in the energization of winding 74 FIG. 2, can be obtained through the use of a capacitor 104. The instantaneous resetting is effected when the capacitor 104 is not used. When one of the non-linear resistors 64 or 65 is omitted in the bridge circuit 63 as indicated above, it is replaced by a linear resistor of suitable value.

FIG. 6 shows a current flow indicator system, generally at 107 in which the functioning of the trip circuit and the reset circuit are essentially independent of each other. The conductor 10 is embraced by a magnetic core 11' which, while not provided with a hinged joint as is the magnetic core 11, previously described, still is capable of being opened to receive the conductor 10. The construction of the magnetic core 11' will be described in detail hereinafter. A winding 15 embraces the magnetic core 11'. For illustrative purposes it is pointed out that it may comprise 10,000 turns of No. 37 wire. It has a center tap 108 which is connected by conductor 109 to a fault or trip circuit indicated, generally, at 24'. The fault or trip circuit 24' comprises the silicon controlled rectifier 44 previously described and a glow discharge device or neon lamp 43. The functioning of the fault or trip circuit 24 is triggered by a voltage divider circuit, indicated generally, at 110. It comprises a resistor 111 which may have a resistance of 300,000 ohms and a variable resistor 112 that may have a resistance of 150,000 ohms. The voltage divider resistor is connected across the anode 44a and a cathode 44c of the silicon controlled rectifier 44. An intermediate point 113 of the voltage divider resistor 110 is connected to one terminal of the flow discharge device 43. The fault or trip circuit 24 is connected through a zener diode 114 to the winding 94 of the rotatable indicator assembly 95 which is constructed as previously described in connection with FIGS. 3, 4 and 5. The zener diode 114 clips the lower one fourth of a full wave rectified wave for the purpose of allowing the silicon controlled rectifier 44 to turn off or become nonconducting. Provided that the zener diode 114 has the requisite characteristics, it can be employed for controlling the tripping operation of the winding 94 without employing the fault or trip circuit 24'. However, it is preferable to employ the fault or trip circuit 24' because of greater flexibility in components and economies in construction and because it narrows the limits between the trip and reset current.

The second winding 15 on the magnetic core 11' is connected to energize a full wave rectifier 21. In order to increase the voltage for energizing the full wave rectifier 21 a capacitor 117 is connected between the conductors 16 and 17 and across the secondary winding 15. The capacitor 117 has a capacitance of .068 mfd and together with a secondary winding 15 provides a resonant condition. This is of particular importance on flow of relatively low current, such as 5 amperes, in the conductor 10 as the esult of result it is desirable that the reset circuit 25' be operated to reset the rotatable indicator assembly 95 after it has been operated to the tripped position.

The energization of the reset circuit 25' is controlled by a timing circuit that is indicated, generally, at 118. The timing circuit 118 comprises a resistor 119 which may have a resistance of 500,000 ohms and a capacitor 120 that may have a capacitance of 1 mfd. The timing circuit 118 is connected between the conductors 22 and 23 and across the output terminals of the rectifier 21. A junction 121 between the resistor 119 and the capacitor 120 is connected to the anode 57a of the silicon controlled rectifier 57 which has been described previously. The reset circuit 25' is connected to one terminal 122 of the winding 94 while the other terminal 123 is connected to the zener diode 114. A center tap 124 of the winding 94 is connected by the conductor 23 to the negative terminal of the rectifier 21. A capacitor 125 is connected between the terminal 123 and the center tap 124 of the winding 94 and may have a capacitance of .2 mfd. It is a 20 volt ceramic capactior and is employed to absorb the surge from the reset circuit 25' induced in the lower half of the winding 94 incident to the resetting operation.

In operation, when normal load current flows in the alternating current conductor 10 sufficient voltage is applied to the rectifier 21 to maintain the reset circuit 25' in operation with the indicator disk 97 in the reset position in which the white sections 99 only are visible. On flow of fault current, such as a current exceeding the normal loading current a maximum of which may be of the order of 300 to 400 amperes, sufficient voltage is applied across the voltage divider 110 to render the glow discharge device 43 conducting with the result that the silicon controlled rectifier 44 becomes conducting and current flows through the lower half of the winding 94 to shift the polarities of the poles 92 and 93 and effect a corresponding shifting of the permanent magnet 96 so that only the red sections 98 of the indicator disk 97 are visible. It is assumed that, under these fault current conditions, a current interrupter operates to interrupt the flow of alternating current in the conductor 10. However, because of the retentivity of the poles 92 and 93, the indicator disk 97 remains in the fault indicating condition.

When normal load current is returned to the conductor 10 and this may be of the order of 5 amperes, the rectifier 21 is energized and the capacitor 120 is charged through the resistor 119 to a voltage and at a time depending upon the values of the resistance of the resistor 119 and the capacitance of the capacitor 120 in connection with the voltage applied from the rectifier 21. When the capacitor 120 receives a sufficient charge the voltage there across is sufficient to render the glow discharge device 56 conducting to trigger the silicon controlled rectifier 57. Then the upper half of winding 94 is energized and the polarities of the poles 92 and 93 are reversed to cause the indicator disk 97 to rotate to the normal position with only the white sections 99 visible.

As pointed out above the magnetic core 11' is constructed without employing a hinged joint such as the hinge joint 14 shown in FIGS. 1 and 2. However, the magnetic core 11' is constructed in such a manner that it can be opened to receive the conductor 10 and to embrace it with a relatively low reluctance magnetic circuit. The preferred construction is illustrated in FIGS. 7–10. Here it will be observed that the magnetic core 11' is formed of a plurality of strips or laminations of oriented silicon steel each having relatively little inherent resiliency. For illustrative purposes four such strips are shown at 130, 131, 132 and 133. The strips or laminations are of increasing length with the shortest being the innermost strip 130. FIG. 8 shows a plan view of the strip 130, for example. It includes rivet openings 134 spaced from the ends for receiving rivets 135 to hold the individual ends together so that the juxtaposed end portions 136 and 137 are in engagement along a joint 138. Each of the strips or laminations has an opening 139 formed therein to provide saturable sections 140 for limiting the magnetic flux that is induced in the magnetic core 11'. This is of particular importance when it is recalled that the current flow in the conductor 10 may be of the order of several thousand amperes under certain current fault conditions. The diameter indicated at 141 of the inner strip or lamination 130 is such as to readily accommodate the conductor 10 in a manner illustrated in FIG. 10. Clearance 142 is provided between the strips or laminations of sufficient dimension to permit relative freedom of motion of the several strips or laminations.

For constructing the magnetic core 11' the strips or laminations are cut from a coil of the oriented silicon steel having relatively little inherent resiliency so as to have successively increasing lengths. The following indicates how the lengths are determined:

$$L_{130} = \pi (d + 2t)$$
$$L_{131} = \pi (d + 4t)$$
$$L_{132} = \pi (d + 6t)$$
$$L_n = \pi (d + 2nt)$$

Where
$L$ — length of strip
$d$ = Diameter 141
$t$ = thickness of strip plus addendum for clearance 142
$n = $ *number of strip*

After the strips or laminations have been cut to the indicated lengths the ends are pierced to provide the openings 134 for the rivets 135. Also the openings 139 are punched out to provide the saturable sections 140. Next the strips or laminations are individually coiled to a diameter less than the diameter indicated at 141 to prestress them. Finally they are assembled in the order of successively greater lengths outward and the rivets 135 are applied to the end portions 136 and 137. The result of the prestressing of the strips or laminations is to provide a self closing split magnetic core 11' by spring action having a positive and durable force to maintain the end portions 136 and 137 in engagement at the joint 138. However, the assembly has sufficient resiliency to permit the magnetic core 11', assembled as described, to be opened to about 75 percent of the diameter indicated at 141 to receive the conductor 10 without loss of closing force required to maintain the end portions 136 and 137 in engagement to provide a minimum reluctance magnetic circuit.

While the method of forming the magnetic core 11' from individual strips or laminations as described above is preferable, the magnetic core 11' can be formed in another manner. Instead of cutting the strips of laminations to the individual lengths, a strip of oriented silicon steel having relatively little inherent resiliency is coiled in spiral fashion about a suitable arbor with the inner diameter being substantially less than the desired final diameter such as that indicated at 141. After a sufficient number of turns in the spiral configuration have been formed in this manner, the spiral arrangement is unwound to provide the inner diameter 141 as desired. Then rivets or other holding means are inserted in spaced relation to what finally will be joint 138. Finally a saw cut is made between the holding means or rivets with the result that the magnetic core 11' is formed which can be opened and self closed in the manner previously described.

After the magnetic core 11' has been formed by either of the methods above described, the secondary winding 15 is applied as indicated in FIG. 9.

In order to avoid corrosion of the magnetic core 11' it and the secondary winding 15 are encapsulated in conventional manner to provide the covering indicated at 143.

It is desirable that a film of insulation be provided between the juxtaposed end portion 136 and 137 to reduce vibration to a minimum incident to induction of alternating magnetic flux in the core 11'. Accordingly, after the assembly has been made as indicated in FIG. 10 a layer 144 of suitable self curing cement is applied to the faces of the end portions 136 and 137. This effectively reduces vibration and generation of noise at this point.

For illustrative purposes four strips of laminations have been shown and the clearance 142 therebetween has been exaggerated. A larger number of strips of laminations having a thickness of the order of .021 inch can be used with a smaller clearance.

Referring to FIG. 11 it will be observed that the conductor 10 has associated therewith the magnetic core 11' having the winding 15 thereon. The output of the winding 15 is employed for controlling the operation of a magnetic field structure 86' that is the same as the magnetic field structure 86 with the indicator mechanism except that two windings 94A and 94B are employed instead of a single winding. Winding 94A is a reset winding and winding 94B is a trip winding.

A trip circuit is indicated, generally, at 147. It includes a full wave rectifier 148 that is connected for energization between a tap 149 on winding 15 and one end thereof. Preferably the winding 15 comprises 10,000 turns and the tap 149 is connected at a point where 1,000 turns are connected across rectifier 148. By varying the position of the tap 149 it is possible to vary the current in the conductor 10 at which the indicator disc 97 is shifted to the tripped position indicating that current in excess of a predetermined current has flowed in the conductor 10. The trip circuit 147 includes a voltage sensitive switch, such as a silicon controlled rectifier 149, a trigger diode 150, calibrating resistors 151 and 152, which may be omitted, and a resistor 153. The zener diode 114 is interposed between the silicon controlled rectifier 149 and the trip winding 94B.

The calibrating resistors 151 and 152 and/or the position of tap 149 are selected to cause the trigger diode 150 to become conducting, for example on application thereto of 32 volts, at the desired current flow in the conductor 10. The silicon controlled rectifier 149 then conduts current to energize trip winding 94B and pivot the indicator disc 97 to the tripped position.

A reset circuit is indicated, generally, at 156. It is connected for energization across the entire winding 15 and resonating capacitor 117 for energization of minimum current flow, for example 2 amperes, in conductor 10. To amplify the low current output a voltage doubler circuit, indicated generally at 157, is employed. It is energized through resistors 158 and 159, each having a resistance of the order of 100,000 ohms. The voltage doubler circuit includes oppositely connected rectifiers 160 and 161 and capacitors 162 and 163. The doubled voltage is applied to a trigger diode 164 for controlling a voltage sensitive switch, such as a silicon controlled rectifier 165. A resistor 166 is connected between the gate and cathode of the silicon controlled rectifier 165.

On reenergization of the conductor 10 after current flow therein has been interrupted and the indicator disc 97 has been pivoted to the tripped position, the normal relatively small load current induces a corresponding voltage in winding 15. Capacitors 162 and 163 are charged on successive half cycles of the alternating current. Since the capacitors 162 and 163 are connected in series, the unidirectional voltage across both of them is applied to the trigger diode 164. When this voltage reaches a predetermined value, for example 32 volts, the silicon controlled rectifier 165 becomes conducting and the charge on capacitors 162 and 163 is applied to the reset winding 94A through conductor 167. Then the indicator disc 97 is pivoted to the reset position. It remains in the reset position until the current flow in the conductor 10 exceeds that for which the trip circuit 147 is set. Then, as described, the indicator disc is pivoted to the tripped position.

Because of the relatively high resistance of the resistors 158 and 159, a substantial time of the order of several seconds is required to charge the capacitors 162 and 163 in the voltage doubler circuit 157. There is a corresponding delay in resetting of the indicator disc 97 to the normal or reset position. This time delay is desirable in order to prevent resetting of the indicator disc 97 after the occurrence of flow of fault current in conductor 10 followed by transient current flow, such as that through an arc, below that required to energize trip winding 94B before a circuit interrupter opens the circuit. While fault current flows in the conductor 10, the current flow in the section of winding 15 connected across the rectifier 148 is sufficient to effectively place a short circuit on the winding 15. Thus the reset circuit 156 is effectively deenergized during this period of operation.

During normal operation of the system shown in FIG. 11 below the level of current flow in the conductor 10 sufficient to energize the trip winding 94B, the reset circuit 156 continues to be energized to hold the indicator disc in the reset position.

What is claimed is:

1. Means responsive to flow of alternating current in a conductor comprising: A magnetic core for linking said conductor for induction therein of alternating magnetic flux as a function of the magnitude of said flow of alternating current, a secondary winding linking said magnetic core, rectifier means connected for energization to said secondary winding and having a direct output voltage a function of said current flow in said conductor, indicator means movable from one position to another position, permanent magnet means connected to said indicator means for moving it, operating winding means for shifting said permanent magnet means, circuit means interconnecting said rectifier means and said operating winding means including trip means to energize said operating winding means to shift said indicator means from said one position to said other position on flow of current in said conductor above a predetermined value, and circuit means interconnecting said rectifier means and said operating winding means including reset means to energize said operating winding means to shift said indicator means back to said one position on flow of current in said conductor below said predetermined value and above a predetermined minimum value, said secondary winding having a center tap connected to said trip means, and said operating winding means having a center top connected to said rectifier means.

2. Means responsive to flow of alternating current in a conductor comprising: a magnetic core for linking said conductor for induction therein of alternating magnetic flux as a function of the magnitude of said flow of alternating current, a secondary winding linking said magnetic core, rectifier means connected for energization to said secondary winding and having a direct output voltage a function of said current flow in said conductor, indicator means movable from one position to another position, permanent magnet means connected to said indicator means for moving it, operating winding means for shifting said permanent magnet means, circuit means interconnecting said rectifier means and said operating winding means including trip means to energize said operating winding means to shift said indicator means from said one position to said other position on flow of current in said conductor above a predetermined value, and circuit means interconnecting said rectifier means and said operating winding means including reset means to energize said operating winding means to shift said indicator means back to said one position on flow of currnt in said conductor below said predetermined value and above a predetermined minimum value, said trip means including a silicon controlled rectifier having an anode, a cathode, and a gate, a glow discharge device connected to said gate, and voltage divider resistor means connected between said anode and cathode and to said glow discharge device to render the same conducting on said current flow above said predetermined value.

3. Means responsive to flow of alternating current in a conductor comprising: a magnetic core for linking said conductor for induction therein of alternating magnetic flux as a function of magnitude of said flow of alternating current, a secondary winding linking said magnetic core, rectifier means connected for energization to said secondary winding and having a direct output voltage a function of said current flow in said conductor, indicator means movable from one position to another position, permanent magnet means connected to said indicator means for moving it, operating winding means for shifting said permanent magnet means, circuit means interconnecting said rectifier means and said operating winding means including trip means to energize said operating winding means to shift said indicator means from said one position to said other position on flow of current in said conductor above a predetermined value, and circuit means interconnecting said rectifier means and said operating winding means including reset means to energize said operating winding means to shift said indicator means back to said one position on flow of current in said conductor below said predetermined value and above a predetermined minimum value, said reset means including a silicon controlled rectifier having an anode, a cathode and a gate, a glow discharge device connected between said anode and said gate, a capacitor and a charging resistor connected in series and across the output of said rectifier means, and circuit means interconnecting the junction between said capacitor and said resistor and said glow discharge device to render the same conducting on said current flow below said predetermined value.

4. Means responsive to flow of alternating current in a conductor comprising: a magnetic core comprising a plurality of circular strips of prestressed magnetic material capable of being endwise opened to admit said conductor and to be closed with the ends juxtaposed for linking said conductor for induction therein of alternating magnetic flux as a function of the magnitude of said flow of alternating current, a secondary winding linking said magnetic core, rectifier means connected for energization to said secondary winding and having a direct output voltage a function of said current flow in said conductor, indicator means movable from one position to another position, permanent magnet means connected to said indicator means for moving it, operating winding means for shifting said permanent magnet means, circuit means interconnecting said rectifier means and said operating winding means including trip means to energize said operating winding means to shift said indicator means from said one position to said other position on flow of current in said conductor above a predetermined value, and circuit means interconnecting said rectifier means and said operating winding means including reset means to energize said operating winding means to shift said indicator means back to said one position on flow of current in said conductor below said predetermined value and above a predetermined minimum value, said secondary winding having a center tap connected to said trip means, and said operating winding means having a center tap connected to said rectifier means.

5. Current responsive means according to claim 4 wherein said core and said secondary winding are encapsulated in insulating material.

6. Current responsive means according to claim 4 wherein said strips have saturable sections to limit induction in said secondary winding.

7. Means responsive to flow of alternating current in a conductor comprising: a magnetic core for linking said conductor for induction therein of alternating magnetic flux as a function of the magnitude of said flow of alternating current, a secondary winding linking said magnetic core, first and second rectifier means connected for energization to said secondary winding and having direct output voltages functions of said current flow in said conductor, indicator means movable from a reset position to a trip position, permanent magnet means connected to said indicator means for shifting it between said reset and trip positions, trip and reset windings for shifting said permanent magnet means, circuit means interconnecting said first rectifier means and said trip winding including trip means to energize said trip winding to shift said indicator means from said reset position to said trip position on flow of current in said conductor above a predetermined value, and circuit means interconnecting said second rectifier means and said reset winding including reset means to energize said reset winding to shift said indicator means to said reset position on flow of current in said conductor below said predetermined minimum value and above a predetermined value, said secondary winding having a tap connected to said rectifier means, and said reset winding having a connection to said second rectifier means.

8. Current responsive means according to claim 7 wherein said second rectifier means comprises voltage doubler means.

9. Current responsive means according to claim 8 wherein said voltage doubler means is connected to said secondary winding through resistance means whereby there is a time delay in the energization of said reset winding.

10. Current responsive means according to claim 8 wherein said voltage doubler means includes series connected capacitors that are individually charged and said reset means includes a voltage sensitive switch that is rendered conducting when the charge on said capacitors reaches a predetermined level.

11. Current responsive means according to claim 7 wherein said tap is connected to said secondary winding at a point where a relatively small number of turns thereof are connected across said first rectifier means.

12. Current responsive means according to claim 7 wherein said trip means includes a voltage sensitive switch that is rendered conducting when the current flow in said conductor is at a predetermined value.

13. Means responsive to flow of alternating current in a conductor comprising: a magnetic core for linking said conductor for induction therein of alternating magnetic flux as a function of the magnitude of said flow of alternating current, a secondary winding linking said magnetic core, rectifier means connected for energization to said current flow in said conductor, indicator means movable from one position to another position, permanent magnet means connected to said indicator means for moving it, operating winding means for shifting said permanent magnet means, circuit means interconnecting said rectifier means and said operating winding means including trip means to energize said operating winding means to shift said indicator means from said one position to said other position on flow of current in said conductor above a predetermined value, and circuit means interconnecting said rectifier means and said operating winding means including reset means to energize said operating winding means to shift said indicator means back to said one position on flow of current in said conductor below said predetermined value and above a predetermined minimum value, said trip means including a silicon controlled rectifier having an anode, a cathode and a gate, trigger means connected to said gate, and circuit means connected between said rectifier means and said trigger means to render the same conducting on said current flow above said predetermined value.

* * * * *

PO-1050
(5/69)

UNITED STATES PATENT OFFICE
CERTIFICATE OF CORRECTION

Patent No. 3,816,816                Dated June 11, 1974

Inventor(s) Edmund O. Schweitzer, Jr.

It is certified that error appears in the above-identified patent and that said Letters Patent are hereby corrected as shown below:

Column 1, line 28 for "rest" read -- reset--;
          line 39 for "counductor" read -- conductor--.
Column 5, line 32 for "necessary", read -- unnecessary.--.
Column 8, line 44 for "esult of result" read --result of which --; line 66 for "capactior" -- read -- capacitor --.
Column 9, line 9 for "loading" read -- load --.
Column 11, line 43 for "conduts" read -- conducts --.
Column 12, line 59 for "top" read -- tap --.
Column 14,
                                        line 50 before
          "rectifier" insert -- first --.
Column 15, delete lines 10-19.
Column 16, delete lines 1-18.

Signed and sealed this 3rd day of December 1974.

(SEAL)
Attest:

McCOY M. GIBSON JR.                    C. MARSHALL DANN
Attesting Officer                      Commissioner of Patents